(12) United States Patent
Bauer

(10) Patent No.: US 6,327,133 B1
(45) Date of Patent: Dec. 4, 2001

(54) NYLON SHELL DOGHOUSE CAPACITOR ASSEMBLY

(75) Inventor: Stacey G. Bauer, Lemoyne, NE (US)

(73) Assignee: American Shizuki Corporation, Ogallala, NE (US)

( * ) Notice: Subject to any disclaimer, the term of this patent is extended or adjusted under 35 U.S.C. 154(b) by 0 days.

(21) Appl. No.: 09/346,351

(22) Filed: Jul. 2, 1999

(51) Int. Cl.$^7$ .............................. H01G 4/00; H01G 4/228
(52) U.S. Cl. ................................. 361/301.3; 361/306.1; 361/308.1
(58) Field of Search .................. 361/301.1, 301.5, 361/306.1, 306.3, 307, 308.1, 309, 517–520, 536–540

(56) References Cited

U.S. PATENT DOCUMENTS

| | | |
|---|---|---|
| 1,794,289 | 2/1931 | Haefely . |
| 2,058,773 | 10/1936 | Cole . |
| 2,671,126 | 3/1954 | Brennan . |
| 2,758,149 | 8/1956 | Brennan . |
| 2,763,708 | 9/1956 | Brennan . |
| 3,686,536 | 8/1972 | Pearce et al. . |
| 4,039,905 * | 8/1977 | Pearce et al. .................. 361/525 |
| 4,234,905 | 11/1980 | Benezech . |
| 4,240,126 | 12/1980 | Sanvito . |
| 4,413,305 * | 11/1983 | FitzGerald . |
| 4,547,829 | 10/1985 | Efford et al. . |
| 4,661,876 * | 4/1987 | Strange et al. ................. 361/15 |
| 4,757,414 * | 7/1988 | Barker et al. .................. 361/15 |
| 5,019,934 * | 5/1991 | Bentley et al. ................. 361/15 |
| 5,493,158 | 2/1996 | Daniels . |

* cited by examiner

Primary Examiner—Anthony Dinkins
(74) Attorney, Agent, or Firm—Merchant & Gould P.C.

(57) ABSTRACT

A monolithic capacitor assembly is provided that is designed to easily and efficiently attach to an external device, such as a motor. The capacitor assembly comprises a capacitor body and an electrical termination electrically coupled to the capacitor body. The capacitor body and electrical termination are inserted into a cylindrical nylon shell that is sized and configured to receive the capacitor body and electrical termination such that the electrical termination extends through an indentation located along the open end of the nylon shell. In another embodiment of the present invention, the electrical termination is an electrical termination device. The electrical termination device rests within the indentation located along the open end of the nylon shell and is substantially flush with mounting surface of the nylon shell.

21 Claims, 3 Drawing Sheets

NYLON SHELL DOGHOUSE CAPACITOR ASSEMBLY

FIELD OF THE INVENTION

The present invention relates generally to capacitor assemblies, and more particularly, to a capacitor assembly having a monolithic construction designed to easily and efficiently mount to an external device, such as a motor.

BACKGROUND OF THE INVENTION

Capacitors have many industrial uses. For example, motors used for compressors, pumps, and refrigeration and air conditioning equipment typically utilize a capacitor to improve the starting and/or operating performance of the motor. In many cases, however, the capacitor is not an integral component of the motor and must be mounted to the motor's housing prior to operation. Typically, this is accomplished by using a special bracket or by placing the capacitor within a shell and fastening the entire assembly to the motor housing.

A conventional capacitor assembly is shown in FIG. 1. This assembly includes a capacitor, an insulating board, and a metal shell commonly referred to as a "doghouse." The capacitor is completely sealed within a phenolic case and has terminals which extend from an open end in the case. Prior to operation, a user must electrically connect the motor to the capacitor's terminals and insert the phenolic case into the "doghouse." The insulating board is placed between the capacitor's terminals and the "doghouse" to prevent electrical shorts during operation. Once the individual components have been assembled, the "doghouse" must be securably fastened to the motor housing.

Conventional capacitor assemblies such as those exemplified in FIG. 1 have several shortcomings. For example, as discussed above, the capacitor assembly shown in FIG. 1 requires considerable assembly prior to operation. The user must first connect the terminal leads from the capacitor to the motor. In many situations, this typically involves the user soldering the motor leads to the capacitor terminals. Moreover, assembly is made more difficult due to the fact that the capacitor's terminals extend outward from the capacitor body instead of in a direction facing the motor housing.

Moreover, the capacitor assembly shown in FIG. 1 requires a snug fit between the phenolic case and the "doghouse." Thus, in a situation where the phenolic case is too large, it may not fit into the "doghouse," further increasing the difficulty of assembly. Similarly, in a situation where the phenolic case is too small, the resulting capacitor assembly is unstable and susceptible to motor vibrations.

Furthermore, conventional capacitor assemblies are often very large and heavy with respect to their intended use. Despite the electrical requirements for the capacitor, the size and weight of the assembly is largely dependent upon the phenolic shell and metal "doghouse." As described above, the capacitor body is first inserted and sealed within the phenolic case which in turn must fit within the metal "doghouse." The resulting capacitor assembly is often unnecessarily large and heavy. Typically, capacitor assemblies made according to the prior art have a diameter substantially equal to the diameter of the motor housing. Moreover, in order to customize an existing assembly, a user must specify changes in the size of the phenolic case as well as the metal "doghouse."

Accordingly, there arises a need to provide a monolithic capacitor assembly having substantially the same performance characteristics as conventional capacitor assemblies yet, with the added feature of being easy to assemble/mount prior to operation. Furthermore, there is a need to provide a capacitor assembly that is sized appropriately for the needed application. Such a capacitor assembly would provide a more efficient and secure method of assembly and substantially reduce costs associated with installation. The present invention directly addresses and overcomes the shortcomings of the prior art.

SUMMARY OF THE INVENTION

The present invention relates to a monolithic capacitor assembly designed to easily and efficiently mount to an external device, such as a motor. The capacitor assembly includes a capacitor electrically coupled to an electrical termination. The capacitor assembly also includes a cylindrical nylon shell which has a mounting surface enabling the capacitor assembly to be securably attached to a motor housing. In a preferred embodiment of the present invention, the mounting surface is cured to correspond to the outside of a motor housing. The nylon shell has an open end which defines a cavity centrally disposed within the nylon shell. The cavity is sized and configured to receive the capacitor and the electrical termination such that the electrical termination is positioned within an indentation in the mounting surface at the open end of the nylon shell. The electrical termination extends outward from the nylon shell in a direction perpendicular to the mounting surface of the nylon shell. In one embodiment of the present invention, the electrical termination includes at least two solid or stranded lead wires extending through the indentation in the mounting surface. In an alternate embodiment of the present invention, the electrical termination is a standard electrical termination device, such as a a quick disconnect terminal connector or an insulation displacement connector.

The capacitor assembly of the present invention is further enhanced by filling the nylon shell with an epoxy endfill after the capacitor and electrical termination have been inserted within the nylon shell cavity. The epoxy endfill protects and seals the capacitor and the electrical termination, thereby ensuring the integrity of the electrical connection made between the capacitor and the electrical termination during both installation and operation.

Where the electrical termination is an electrical termination device, such as an insulation displacement connector, the epoxy endfill is applied in stages. A first epoxy endfill secures the capacitor within the nylon shell to a first level. This first level completely seals the capacitor and is in close proximity with the insulation displacement connector. Similarly, a second epoxy endfill completely seals the electrical connection between the capacitor body and the insulation displacement connector.

A capacitor assembly according to the present invention is produced by first electrically coupling the capacitor to the electrical termination. The capacitor and electrical termination are next inserted into the cavity of the nylon shell and secured such that the electrical termination extends through the indentation in the mounting surface. The nylon shell is next rotated so that it stands on its closed end. The nylon shell is then filled with an epoxy endfill which protects and seals the electrical connection between the capacitor and the electrical termination.

Where the electrical termination is an electrical termination device, such as an insulation terminal connector, the epoxy endfill is filled to a first level within the nylon shell. This first level defines a point within the nylon shell where the capacitor body is completely sealed and is in close proximity with the electrical termination device. After the first epoxy endfill is allowed to cure, the nylon shell is rotated so that it rests on its side opposite the mounting surface. The open end of the nylon shell is partially covered to allow the nylon shell to be filled with a second epoxy endfill. The second epoxy endfill level is perpendicular to the plane of the first epoxy endfill level and is flush with the open end of the nylon shell. Moreover, the second epoxy endfill extends to a level in close proximity with the electrical termination device leaving a recess within the nylon shell. The electrical termination device is positioned in the recess such that it rests within the indentation and faces a direction perpendicular to the mounting surface.

The above summary of the present invention is not intended to describe each embodiment or every implementation of the present invention. Other objects, features and advantages of the present invention will become more apparent in light of the following detailed description of exemplary embodiments thereof, as illustrated in the accompanying drawings.

BRIEF DESCRIPTION OF THE DRAWINGS

The invention may be more completely understood in consideration of the following detailed description of various embodiments of the invention in connection with the accompanying drawings, in which:

FIG. 3b is a side elevational view of the mounting surface of the nylon shell of FIG. 3a;

FIG. 3c is a side elevational view of the open end of the nylon shell of FIG. 3a;

Figure 1:
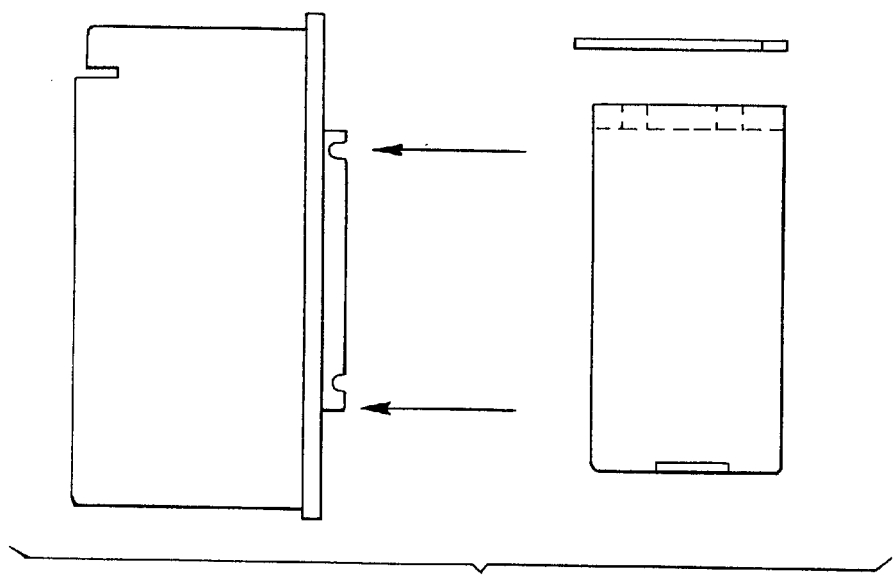
FIG. 1 is an exploded view of a capacitor assembly in accordance with the principles of the prior art.

While the invention is amenable to various modifications and alternative forms, specifics have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENT

The present invention is generally directed toward capacitor assemblies, and in particular is directed toward a monolithic capacitor assembly designed to easily and efficiently mount to an external device, such as a motor. While the present invention is not so limited, a more detailed understanding of the present invention will be gained through a discussion of the drawings in connection with the examples provided below.

Figure 2A:
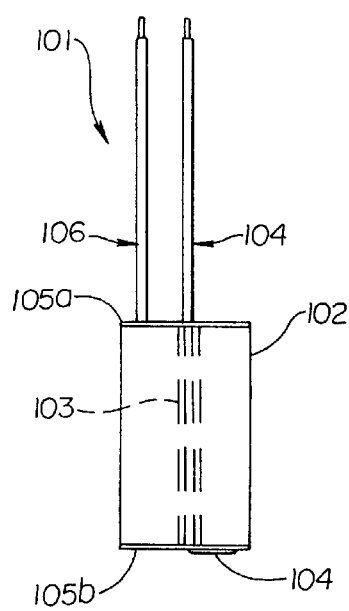
FIG. 2a is a side elevational view of a capacitor body electrically coupled to an electrical termination prior to insertion into the nylon shell of the present invention.

FIG. 2a shows a side elevational view of a capacitor 102 electrically coupled to an electrical termination 101. The capacitor 102 is a standard capacitor. For example, in a preferred embodiment of the present invention, capacitor 102 has windings (not shown) made from a zinc metallized polypropylene. The capacitor windings are wound onto a mandrel 103 made from a polyester-based material. In a preferred embodiment of the present invention, mandrel 103 is hex-shaped and is made from Rynite.

As shown in FIG. 2a, a metal end spray 105a is applied to the proximal end of capacitor 102. Similarly, a metal end spray 105b is applied to the distal end of capacitor 102. In one embodiment of the present invention, electrical termination 101 includes at least two capacitor lead wires 104 and 106. A first capacitor lead wire 104 is electrically coupled to metal end spray 105b. In a preferred embodiment of the present invention, lead wire 104 is an insulated wire that is soldered directly to metal end spray 105b. Lead wire 104 is guided through mandrel 103 and extends above the proximal end of capacitor 102. Similarly, a second capacitor lead wire 106 is electrically connected to the metal end spray 105a at the proximal end of capacitor 102. In a preferred embodiment of the present invention, lead wire 106 is a solid insulated lead wire and extends above the proximal end of the capacitor 102.

Figure 2B:
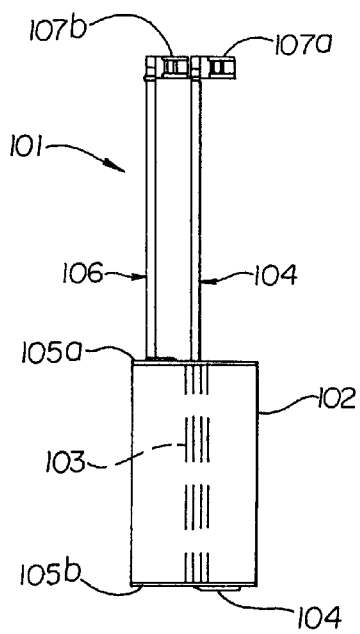
FIGS. 2b and 2c are side elevational views of a capacitor body electrically coupled to an electrical termination device prior to insertion into the nylon shell of the present invention.
Figure 2C:
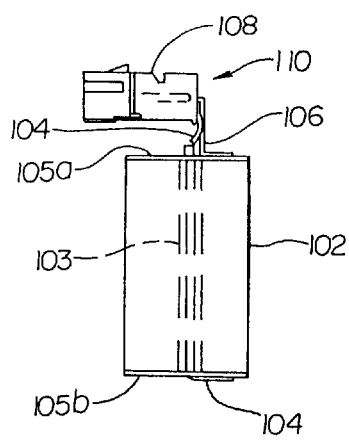

In another embodiment of the present invention, electrical termination 101 is a standard electrical termination device, such as an AMP™ 0.25 inch quick connect terminal connector (Part Number 42742-2). As shown in FIG. 2b, quick connect terminals 107a and 107b are electrically coupled to the distal ends of lead wires 104 and 106, respectively. Similarly, in another embodiment of the present invention, electrical termination 101 is an insulation displacement connector, such as an AMP™ insulation displacement connector (Part Number 640431-2). As shown in FIG. 2c, insulation displacement connector 108 is also electrically coupled to the distal ends of lead wires 104 and 106.

Where the electrical termination is an insulation displacement connector 108, terminal lead wires 104 and 106 extend approximately ¾ of an inch above the proximal end of capacitor 102. Terminal lead wire 104 electrically connects the distal end of capacitor 102 to the rear of the insulation displacement connector at location 110. Similarly, terminal lead wire 106 electrically connects the proximal end of capacitor 102 to the rear of insulation displacement connector 108 at location 110. In a preferred embodiment of the present invention, terminal lead wire 106 is uninsulated.

Figure 2D:
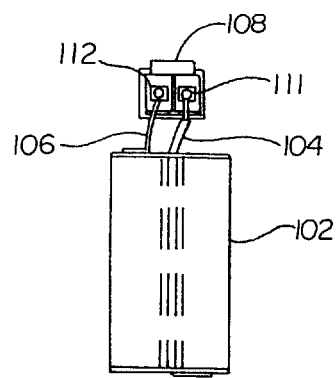
FIG. 2d is a side elevational view of a capacitor body and a electrical termination illustrating the electrical connection made between the capacitor lead wires and the rear of the electrical termination.

FIG. 2d illustrates the rear of insulation displacement connector 108 electrically coupled to capacitor 102. As shown in FIG. 2d, terminal lead wires 104 and 106 are electrically coupled to insulation displacement connector 108 at locations 111 and 112, respectively. In a preferred embodiment of the present invention, lead wires 104 and 106 are soldered to insulation displacement connector 108.

Insulation displacement connector 108 provides a simple and easy electrical connection between the capacitor assembly to an external device such as a motor. As discussed above, insulation displacement connector 108 typically is a standard electric terminal. Thus, the electrical leads from the external device can be equipped with a similar electrical connector which corresponds to insulation displacement connector 108. Accordingly, electrically coupling the external device to the capacitor assembly is an easy and efficient procedure. It should further be recognized that electrical termination 101 would include any electrical termination enabling the capacitor assembly to electrically couple with an external device easily and efficiently consistent with the teachings of the present invention.

Figure 3A:
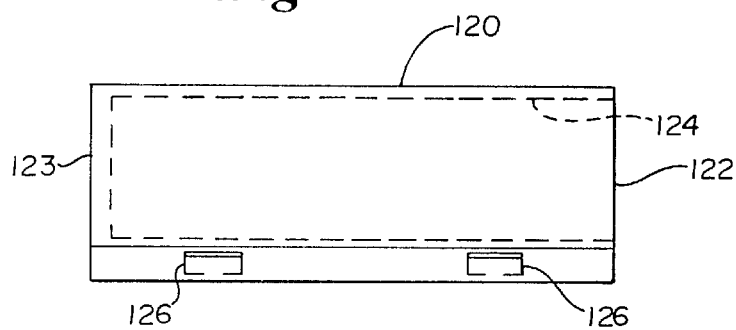
FIG. 3a is a side elevational view of a nylon shell in accordance with the principles of the present invention.
Figure 3B:
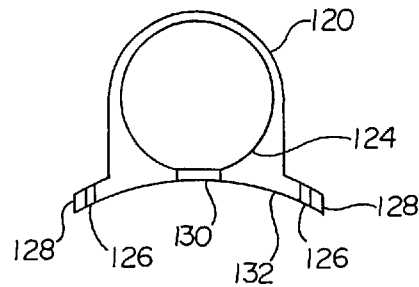
Figure 3C:
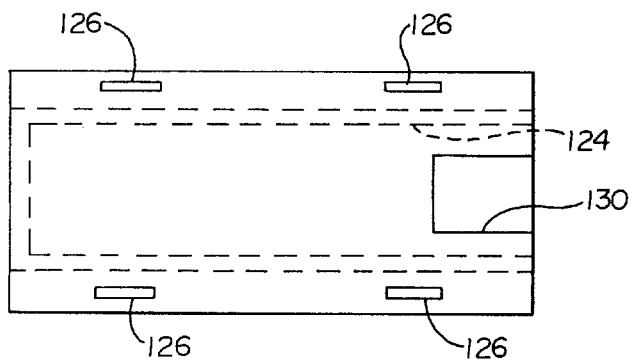

FIGS. 3a, 3b, and 3c show an exemplary nylon shell according to the principles of the present invention. As shown in FIG. 3a, a nylon shell 120 is shown having an open end 122. Open end 122 defines a cylindrical cavity 124 centrally disposed within nylon shell 120. In a preferred embodiment of the present invention, the cavity has a length substantially equal to the total length of nylon shell 120.

Moreover, as shown in FIG. 3b, nylon shell 120 has a mounting surface 132 which facilitates the attachment of the capacitor assembly onto an external device, such as a motor. In this regard, in a preferred embodiment of the present invention, mounting surface 132 is curved to correspond to the outside of a motor housing (not shown). Furthermore, mounting surface 132 defines mounting legs 128. A plurality of mounting slots 126 are bored through mounting legs 128 to allow the capacitor assembly to be mounted onto a motor housing. In one embodiment of the present invention, mounting slots 126 are capable of receiving bolts. Alternatively, slots 126 can be modified so that the capacitor assembly is capable of being mounted to a motor housing using tabs. Mounting slots 126 are further illustrated in FIG. 3c.

Figure 4A:
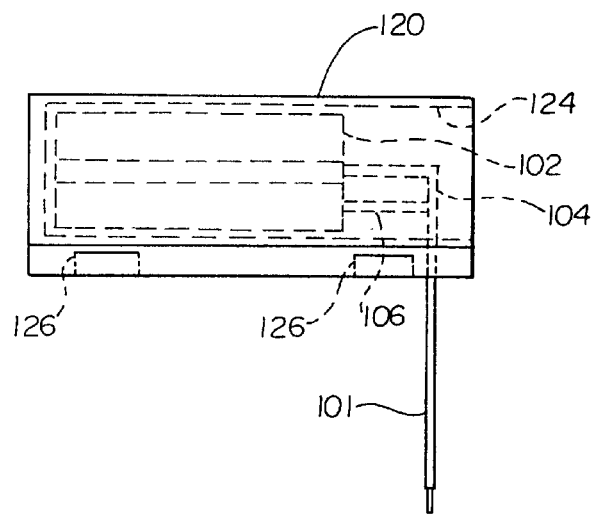
FIG. 4a is a side elevational view of the capacitor assembly showing the capacitor and electrical termination extending perpendicular to the mounting surface of the nylon shell.

FIG. 3c shows the mounting surface 132 of nylon shell 120. As is clearly shown is FIG. 3c, indentation 130 is defined through mounting surface 132 near open end 122 of nylon shell 120. After capacitor body 102 and electrical termination 101 have been properly connected, they are inserted into cavity 124 of nylon shell 120. Indentation 130 is sized and configured to receive electrical termination 101 thus providing an easy and simple electrical connection to an external device, such as a motor. For example, in a preferred embodiment of the present invention, electrical termination 101 extends through indentation 130 as shown in FIG. 4a. Where electrical termination 101 is an electrical termination device, such as insulation displacement connector 108, insulation displacement connector 108 rests within indentation 130.

Nylon shell 120 is filled with an epoxy endfill to seal and secure capacitor body 102 and electrical termination 101. In one embodiment of the present invention, nylon shell 120 is filled with an epoxy endfill to a level substantially flush with open end 122. Alternatively, a nylon cap (not shown) can be used to seal the capacitor body 102 and electrical termination 101 within nylon shell 120. In another embodiment of the present invention where electrical termination 101 is an insulation displacement connector, the epoxy endfill occurs in stages.

Figure 4B:
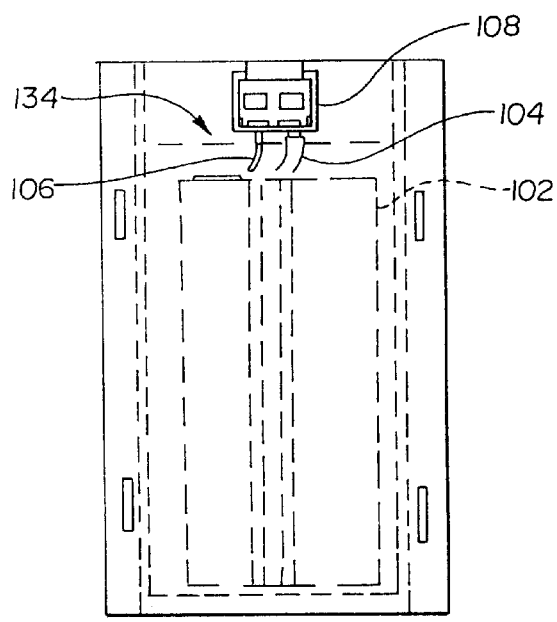
FIG. 4b is a bottom plan view of the capacitor assembly showing the capacitor and electrical termination device disposed within the nylon shell.

As shown in FIG. 4b, nylon shell 120 is filled to a first fill level 134 such that capacitor body 102 is completely secured and sealed. Additionally, as shown in FIG. 4b, nylon shell 120 is filled with a second epoxy endfill to a second fill level 136 such that the electrical connection between the capacitor 102 and insulation displacement connector 108 is also sealed. The resulting monolithic capacitor assembly is completely secure and is easy to mount to an external device such as a motor.

An exemplary method for assembling and mounting the capacitor assembly includes first placing the electrically coupled capacitor 102 and electrical termination 101 into cavity 124 of nylon shell 120. As described above, cavity 124 is sized and configured such that capacitor 102 fits within nylon shell 120. Electrical termination 101 extends through an indentation 130 defined through mounting surface 132. Where electrical termination 101 is an electrical termination device, such as insulation terminal connector 108, insulation terminal connector 108 rests within indentation 130.

Additionally, indentation 130 ensures that the capacitor body 102 and electrical termination 101 are properly aligned within the nylon shell 120. In a preferred embodiment of the present invention, electrical termination 101 extends from the nylon shell in a direction perpendicular to the mounting surface as shown in FIG. 4a.

After capacitor body 102 and electrical termination 101 are properly placed and secured within nylon shell 120, nylon shell 120 is rotated so that it stands on closed end 123. In this position, cavity 124 is injected with an epoxy endfill to seal and secure capacitor 102 and electrical termination 101 within the nylon shell. In one embodiment of the present invention, the epoxy endfill extends to a level substantially flush with the open end 122 of the nylon shell.

In an alternate embodiment of the present invention where electrical termination 101 is an electrical termination device, such as insulation displacement connector 108, the nylon shell 120 is filled in stages. The nylon shell 120 is filled to a first fill level 134 which defines a level within nylon shell 120 whereby capacitor 102 is completely sealed and the endfill is in close proximity with insulation displacement connector 108. Capacitor body 102 and insulation displacement connector 108 can be secured within cavity 124 using tape to ensure that insulation displacement connector 108 remains substantially flush with mounting surface 132.

Figure 5:
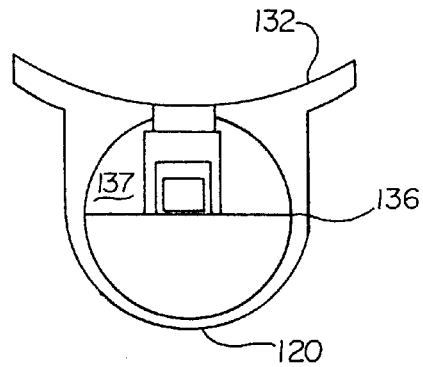
FIG. 5 is an end elevational view of the capacitor assembly showing the open end of the nylon shell after the second epoxy endfill.

After the first epoxy endfill has cured, the capacitor assembly is rotated so that it lies flat on its side opposite mounting surface 132. Open end 122 is partially covered and a second epoxy endfill is injected into nylon shell 120 to a second fill level 136 as shown in FIG. 5. The second level 136 fills substantially half of cavity 124 and completely stabilizes and seals the electrical connection between capacitor body 102 and insulation displacement connector 108. Furthermore, the second epoxy endfill is substantially flush with open end 122 of nylon shell 120 and is in close proximity with insulation displacement connector 108 leaving a recess 137 within nylon shell 120. Insulation displacement connector 108 is positioned in recess 137 such that it rests within indentation 130 and faces a direction perpendicular to mounting surface 132.

As noted above, the present invention is applicable to a number of different embodiments for a monolithic capacitor assembly. Accordingly, the present invention should not be considered limited to the particular examples describe above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed:

1. A monolithic capacitor assembly, comprising a capacitor, an electrical termination device electrically coupled to the capacitor, and a cylindrical nylon shell having an open end and a mounting surface defining an indentation along the open end of the nylon shell, the nylon shell being sized and configured to receive the capacitor through the open end such that the electrical termination device extends through the indentation along the open end of the nylon shell in a direction substantially perpendicular to the mounting surface;

wherein the electrical termination device is an insulation displacement connector that rests within the indentation along the open end of the nylon shell.

2. The capacitor assembly of claim 1, wherein the electrical termination device is a quick connect terminal.

3. The capacitor assembly of claim 1, wherein the electrical termination device is substantially flush with the mounting surface.

4. The capacitor assembly of claim 1, wherein the capacitor is secured and sealed within the nylon shell with an epoxy endfill.

5. A monolithic capacitor assembly, comprising a capacitor, an electrical termination device electrically coupled to the capacitor, and a cylindrical nylon shell having an open end and a mounting surface defining an indentation along the open end of the nylon shell, the nylon shell being sized and configured to receive the capacitor through the open end such that the electrical termination device extends through the indentation along the open end of the nylon shell in a direction substantially perpendicular to the mounting surface;

wherein the capacitor and electrical termination device are secured and sealed within the nylon shell with an epoxy endfill.

6. The capacitor assembly of claim 5, wherein the epoxy endfill extends to a first fill level, wherein the first fill level completely seals the capacitor within the cavity and is substantially parallel with the open end of the nylon shell.

7. The capacitor assembly of claim 6, wherein the first fill level extends to a level in close proximity with the electrical termination device positioned within the indentation along the open end of the nylon shell.

8. The capacitor assembly of claim 6, wherein the epoxy endfill extends to a second fill level, wherein the second fill level is substantially perpendicular to the first fill level and is substantially flush with the open end of the nylon shell.

9. The capacitor assembly of claim 8, wherein the second fill level extends to a level in close proximity with the electrical termination device positioned within the indentation along the open end of the nylon shell.

10. The capacitor assembly of claim 9, wherein the second fill level leaves a recess within the nylon shell, wherein the electrical termination device is positioned in the recess such that it rests within the indentation and faces a direction perpendicular to the mounting surface of the nylon shell.

11. A monolithic capacitor assembly, comprising a capacitor, an electrical termination device electrically coupled to the capacitor, and a cylindrical nylon shell having an open end and a mounting surface defining an indentation along the open end of the nylon shell, the nylon shell being sized and configured to receive the capacitor through the open end such that the electrical termination device extends through the indentation along the open end of the nylon shell in a direction substantially perpendicular to the mounting surface;

wherein the mounting surface further defines a plurality of slots defined through the mounting surface.

12. The capacitor assembly of claim 11, wherein the slots are sized and configured to receive tabs for mounting the capacitor assembly to an external device.

13. The capacitor assembly of claim 11, wherein the mounting surface includes a plurality of slots defined through the mounting surface of the nylon shell enabling the capacitor assembly to be securably mounted to an external device.

14. A capacitor assembly, comprising a capacitor, an electrical termination electrically coupled to the capacitor, and an elongated shell having a cavity sized and configured to receive the capacitor such that the electrical termination extends from the shell in a direction substantially perpendicular to the length of the shell; wherein the mounting surface includes a plurality of slots defined through the mounting surface of the shell enabling the capacitor assembly to be securably mounted to an external device.

15. The capacitor assembly of claim 14, wherein the shell is manufactured from a polymeric material.

16. The capacitor assembly of claim 14, wherein the shell defines a mounting surface having an indentation along the open end of the shell.

17. The capacitor assembly of claim 16, wherein the electrical termination extends through the indentation along the open end of the shell.

18. The capacitor assembly of claim 16, wherein the electrical termination is electrically coupled to an electrical termination device that rests within the indentation along the open end of the shell.

19. The capacitor assembly of claim 18, wherein the electrical termination device is substantially flush with the mounting surface of the shell.

20. A capacitor assembly, comprising a capacitor, an electrical termination electrically coupled to the capacitor, and an elongated shell having a cavity sized and configured to receive the capacitor such that the electrical termination extends from the shell in a direction substantially perpendicular to the length of the shell; wherein the capacitor and electrical termination are secured and sealed within the shell with an endfill.

21. The capacitor assembly of claim 20, wherein th endfill is an epoxy endfill.

* * * * *